(12) United States Patent
Gao et al.

(10) Patent No.: US 11,687,853 B2
(45) Date of Patent: Jun. 27, 2023

(54) ELECTRONIC DEVICE FOR DETECTING BUSINESS SYSTEM AND DETECTION METHOD THEREOF

(71) Applicant: DATA SYSTEMS CONSULTING CO., LTD., New Taipei (TW)

(72) Inventors: Yihai Gao, Shanghai (CN); Hailin Sun, Shanghai (CN)

(73) Assignee: DATA SYSTEMS CONSULTING CO., LTD., New Taipei (TW)

( * ) Notice: Subject to any disclaimer, the term of this patent is extended or adjusted under 35 U.S.C. 154(b) by 384 days.

(21) Appl. No.: 17/086,452

(22) Filed: Nov. 1, 2020

(65) Prior Publication Data

US 2022/0083939 A1   Mar. 17, 2022

(30) Foreign Application Priority Data

Sep. 14, 2020   (CN) .......................... 202010959896.1

(51) Int. Cl.
| | |
|---|---|
| *G06F 9/54* | (2006.01) |
| *G06Q 10/0631* | (2023.01) |
| *G06Q 10/10* | (2023.01) |
| *H04L 51/046* | (2022.01) |
| *G06F 16/953* | (2019.01) |

(52) U.S. Cl.
CPC ....... *G06Q 10/06312* (2013.01); *G06F 9/547* (2013.01); *G06F 16/953* (2019.01); *G06Q 10/10* (2013.01); *H04L 51/046* (2013.01)

(58) Field of Classification Search
CPC ................................ G06F 9/541; G06F 9/542
USPC .................................................. 719/318, 328
See application file for complete search history.

(56) References Cited

U.S. PATENT DOCUMENTS

| | | | | |
|---|---|---|---|---|
| 10,585,722 B2 * | 3/2020 | Agarwal | ................ | G06F 16/25 |
| 11,134,301 B2 * | 9/2021 | Gentile | ................ | G06F 13/22 |
| 2013/0290690 A1 | 10/2013 | Nucci et al. | | |
| 2019/0042988 A1 * | 2/2019 | Brown | ................ | G06N 5/022 |
| 2020/0058025 A1 * | 2/2020 | Raw | ................ | G06Q 20/401 |
| 2021/0218617 A1 * | 7/2021 | Palavalli | ................ | H04L 41/046 |
| 2022/0405115 A1 * | 12/2022 | Smith | ................ | G06F 11/3495 |

FOREIGN PATENT DOCUMENTS

| | | |
|---|---|---|
| CN | 109800207 | 5/2019 |
| CN | 110765166 | 2/2020 |
| TW | 201947492 | 12/2019 |

* cited by examiner

*Primary Examiner* — Andy Ho
(74) *Attorney, Agent, or Firm* — JCIPRNET

(57) ABSTRACT

An electronic device for detecting a business system and a detection method thereof are provided. The electronic device includes a communication module, a storage module, and a processing module. The communication module communicates with the business system. The storage module stores a detection engine and a detection rules corresponding to the business system. The processing module is electrically connected to the storage module and the communication module. The processing module executes the detection engine. The detection engine accesses a detection application program interface of the business system through the communication module according to the detection rule, so that the detection application program interface returns business data corresponding to the business system to the detection engine. Therefore, the electronic device of the disclosure can effectively detect the business system to obtain required relevant business data.

14 Claims, 3 Drawing Sheets

ELECTRONIC DEVICE FOR DETECTING BUSINESS SYSTEM AND DETECTION METHOD THEREOF

CROSS-REFERENCE TO RELATED APPLICATION

This application claims the priority benefit of China application no. 202010959896.1, filed on Sep. 14, 2020. The entirety of the above-mentioned patent application is hereby incorporated by reference herein and made a part of this specification.

BACKGROUND

Technical Field

The disclosure relates to a data detection technology, and in particular to an electronic device for detecting a business system (business operating system) and a detection method thereof.

Description of Related Art

There are many driving methods for executing businesses of modern enterprises, such as detecting business data changes to drive the corresponding task execution. Another example is to detect the addition of order data, and when a new order is found, the subsequent scheduling task is driven. That is to say, the demand scenarios for detecting business data are complicated and the target systems for detection are heterogeneous. Therefore, how to effectively detect business data changes, especially how to detect the business data changes of multiple complicated business systems, is one of the important research directions in the art. The current common data detection measures include methods such as triggers, change data capture (CDC) technology, and database log analysis. However, the existing data detection measures all require additional designs and adaptations for databases of different data storage types, so the amount of development is large, and all the methods have the issues of difficult maintenance and low security. In view of this, solutions will be provided in several embodiments as follows.

SUMMARY

The disclosure provides an electronic device for detecting a business system and a detection method thereof, which can provide a business data detection function of the business system with high security and efficiency.

According to an embodiment of the disclosure, an electronic device for detecting a business system of the disclosure includes a communication module, a storage module, and a processing module. The communication module is configured to communicate with the business system. The storage module is configured to store a detection engine and a detection rule corresponding to the business system. The processing module is electrically connected to the storage module and the communication module. The processing module is configured to execute the detection engine. The detection engine accesses a detection application program interface of the business system through the communication module according to the detection rule, so that the detection application program interface returns business data corresponding to the business system to the detection engine.

According to the embodiment of the disclosure, a detection method of a business system of the disclosure is adapted for being executed by an electronic device to detect the business system. The electronic device includes a communication module, a storage module, and a processing module. The communication module is configured to communicate with the business system. The storage module is configured to store a detection engine and a detection rule corresponding to the business system. The processing module executes the detection engine. The detection method includes the following steps. A detection application program interface of the business system is accessed through the communication module through the detection engine according to the detection rule. Business data corresponding to the business system is returned to the detection engine through the detection application program interface.

Based on the above, the electronic device for detecting the business system and the detection method thereof of the disclosure may detect the corresponding business system by executing the corresponding detection rule through the detection engine designed by the disclosure, so as to effectively obtain the required relevant business data. Moreover, based on the design of the electronic device of the disclosure, the electronic device and the detection method thereof of the disclosure may implement effective data detection for data changes of multiple complicated business systems.

In order for the features and advantages of the disclosure to be more comprehensible, the embodiments are described in detail below in conjunction with the accompanying drawings.

DETAILED DESCRIPTION OF DISCLOSED EMBODIMENTS

Figure 1:
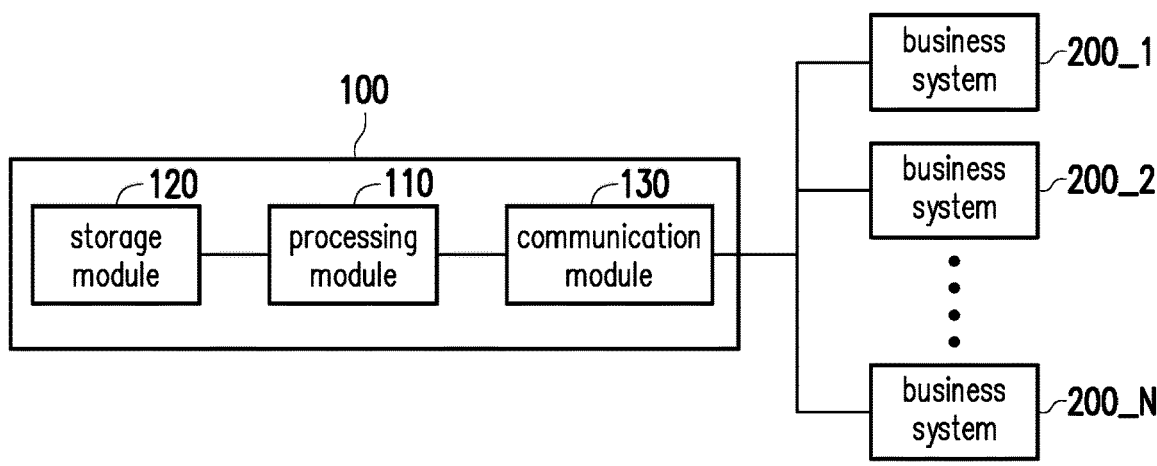
FIG. 1 is a schematic diagram of an electronic device and multiple business systems according to an embodiment of the disclosure.

References will now be made in detail to the exemplary embodiments of the disclosure, and examples of the exemplary embodiments are illustrated in the accompanying drawings. Whenever possible, the same reference numerals are used in the drawings and descriptions to indicate the same or similar parts.

FIG. 1 is a schematic diagram of an electronic device and multiple business systems according to an embodiment of the disclosure. Referring to FIG. 1, an electronic device 100 includes a processing module 110, a storage module 120, and a communication module 130. The processing module 110 is electrically connected to the storage module 120 and the communication module 130. The processing module 110 communicates with multiple external business systems 200_1 to 200_N through the communication module 130, where N is a positive integer. In the embodiment, the electronic device 100 can be, for example, a server host or a cloud server, and may be configured to implement, for example, an enterprise resource planning (ERP) architecture, a statistical analysis system (SAS) architecture, etc. In the embodiment, the electronic device 100 may obtain data of the business systems 200_1 to 200_N through respectively accessing the business systems 200_1 to 200_N, and may be designed to detect data changes of each of the business systems 200_1 to 200_N with a specific access frequency, so that the obtained data change information or required business data may be used for subsequent resource planning or statistical analysis. In the embodiment, the business systems 200_1 to 200_N may be separately, for example, data processing systems corresponding to business platforms such as supply chain and logistics.

In the embodiment, the processing module 110 may be, for example, a central processing unit (CPU), other programmable general-purpose or special-purpose microprocessor, digital signal processor (DSP), programmable controller, application specific integrated circuits (ASIC), programmable logic device (PLD), other similar processing devices, or a combination of these devices. The storage module 120 may be, for example, a dynamic random access memory (DRAM), a flash memory, a non-volatile random access memory (NVRAM), etc. The storage module 120 may be configured to store a detection engine and detection rules described in the various embodiments of the disclosure, and may also be configured to store relevant modules executed by the detection engine, business data received by the detection engine, relevant data produced by the detection engine, etc. The detection engine and the detection rules are implemented in the form of software programs.

In the embodiment, the storage module 120 may store a detection engine and multiple detection rules respectively corresponding to the multiple business systems 200_1 to 200_N, which are read by the processing module 110 to execute the corresponding detection rule, so as to perform data detection on at least one of the multiple business systems 200_1 to 200_N. The business systems 200_1 to 200_N are separately provided with detection application program interfaces and databases. The detection application program interface is implemented in the form of a software program. It is worth noting that the multiple detection application program interfaces of the business systems 200_1 to 200_N are standardized interfaces. In some embodiments, at least a part of the multiple databases of the business systems 200_1 to 200_N may be databases of different data storage types, which may include, for example, relational databases (such as Sql Server, Oracle, MySQL), document databases (such as MongoDB), columnar store databases (such as HBase), key-value databases (such as Redis), etc.

Figure 2:
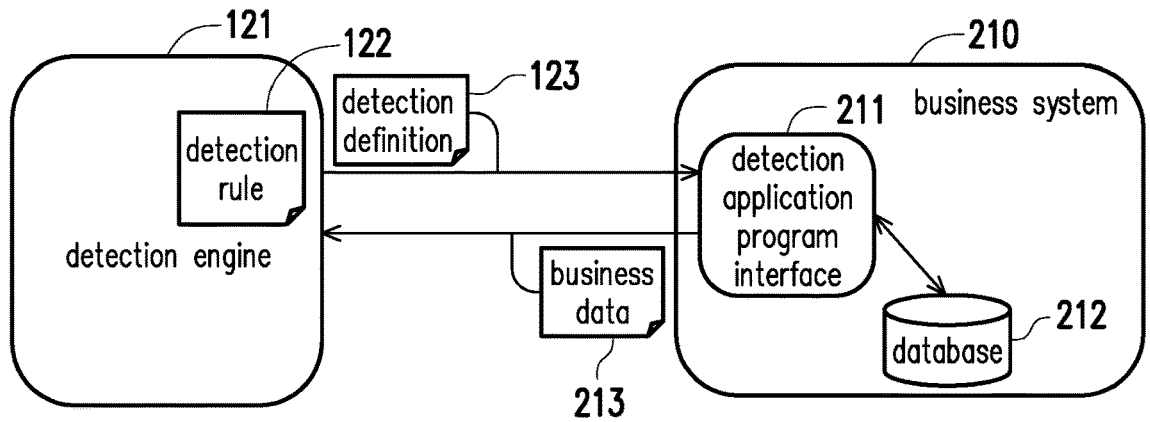
FIG. 2 is a schematic diagram of a relationship between a detection engine and a business system according to an embodiment of the disclosure.
Figure 3:
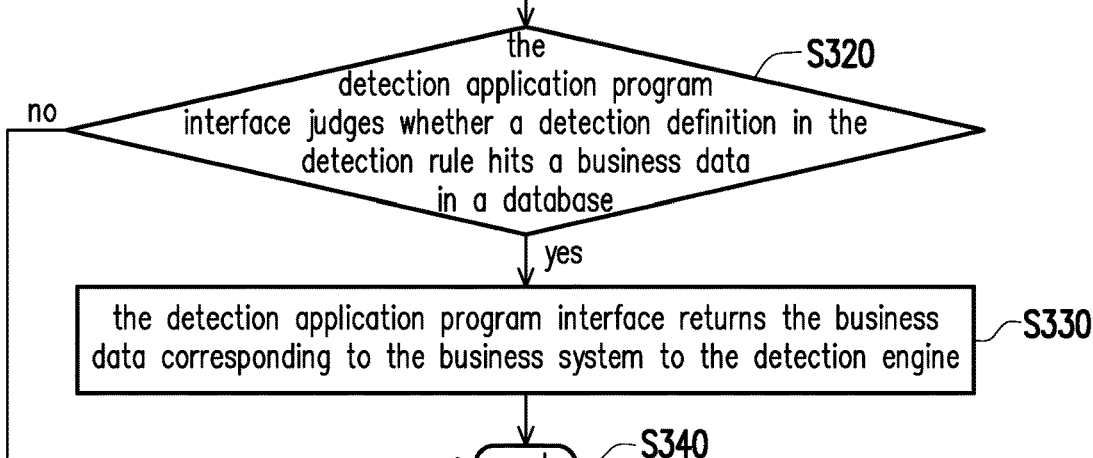
FIG. 3 is a flowchart of a detection method according to an embodiment of the disclosure.

FIG. 2 is a schematic diagram of a relationship between a detection engine and a business system according to an embodiment of the disclosure. FIG. 3 is a flowchart of a detection method according to an embodiment of the disclosure. Referring to FIG. 1 and FIG. 2, FIG. 2 is an example of detecting the business system in FIG. 1. A business system 210 may be, for example, one of the business systems 200_1 to 200_N, and the electronic device 100 may detect the business system 210 according to Steps S310 to S340 in FIG. 3. First, it should be noted that a detection engine 121 of the disclosure may be built based on a microservice architecture, and may be deployed on a cloud server in the form of a software as a service (SaaS) to provide an independent business detection service through a detection application program interface 211 of the business system 210. In addition, the detection rule 122 may be configured to describe a detection logic of a specific business system, and since the detection rule 122 may be stored in the cloud server (for example, a knowledge graph (KG) stored in the cloud), unauthorized modification may be avoided. Specifically, in the embodiment, the detection engine 121 and the detection rule 122 may be, for example, stored in the storage module 120 as shown in FIG. 1, and read and executed by the processing module 110. In the embodiment, the detection rule 122 may include an additional business logic describing a detection definition or a detection frequency, or configured to determine the generation and detection of a message. In Step S310, the detection engine 121 accesses the detection application program interface 211 of the business system 210 through the communication module 130 according to the detection rule 122. In Step S320, the detection application program interface 211 may judge whether a detection definition 123 in the detection rule 122 hits a business data 213 in a database 212. If not, then the electronic device 100 executes Step S340 to end the current detection action. If yes, then the electronic device 100 executes Step S330. In Step S330, the detection application program interface 211 may return the business data 213 corresponding to the business system 210 to the detection engine 121. As such, since the business system 210 of the embodiment is especially provided with the detection application program interface 211, the electronic device 100 may detect the database 212 of the business system 210 through executing the detection engine 121. In particular, when data changes of the database 212 of the business system 210 happen, the electronic device 100 may periodically detect the business system 210 through executing the detection engine 121 according to the detection frequency, such as every few seconds, every few minutes, or every few hours. Therefore, the electronic device 100 may efficiently detect relevant business data changes of the business system 210 in real time.

Based on the technical basis of the foregoing embodiment, in some embodiments of the disclosure, at least a part of the multiple databases of the business systems 200_1 to 200_N may be databases of different data storage types, and the business systems 200_1 to 200_N of the embodiment may be provided with unified standardized detection application program interfaces. In other words, the embodiment does not need to perform complicated detection engine design especially for databases that adapt to different data storage types. The electronic device 100 may independently execute Steps S310 to S340 as shown in FIG. 3 for each of the business systems 200_1 to 200_N to detect the business systems 200_1 to 200_N. Moreover, the user may formulate multiple detection rules respectively corresponding to the multiple business systems 200_1 to 200_N. The multiple detection rules may include multiple detection definitions, and the multiple detection definitions are also unified standardized definitions. The multiple detection definitions are standardized structures, which are abstracted descriptions for detection targets, so as to cover most application scenarios or databases of different data storage types. As such, the detection application program interfaces provided by the business systems 200_1 to 200_N only need to respectively analyze the corresponding detection definitions, so that the specific scanning logic of the storage type data adopted by each system may be implemented. More importantly, the detection engine 121 of the electronic device 100 of the embodiment may send multiple detection definitions of multiple detection rules to the business systems 200_1 to 200_N through an asynchronous manner, so as to reduce waiting due to busy business systems. Therefore, the electronic device 100 of the embodiment may effectively detect data changes of the multiple business systems 200_1 to 200_N that are complicated and have different data storage types.

Figure 4:
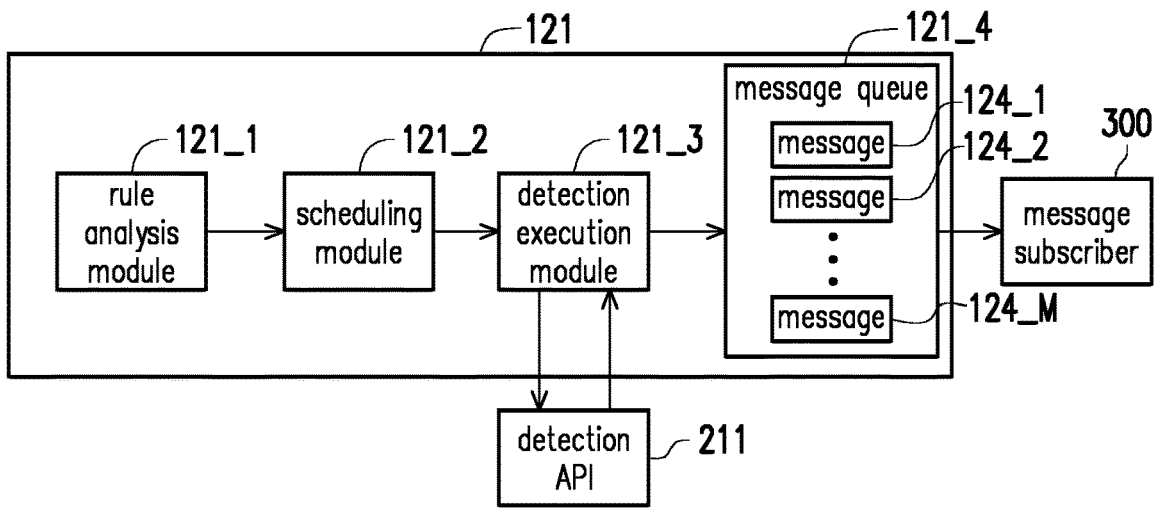
FIG. 4 is a schematic diagram of a detection engine and a detection application program interface according to another embodiment of the disclosure.
Figure 5:
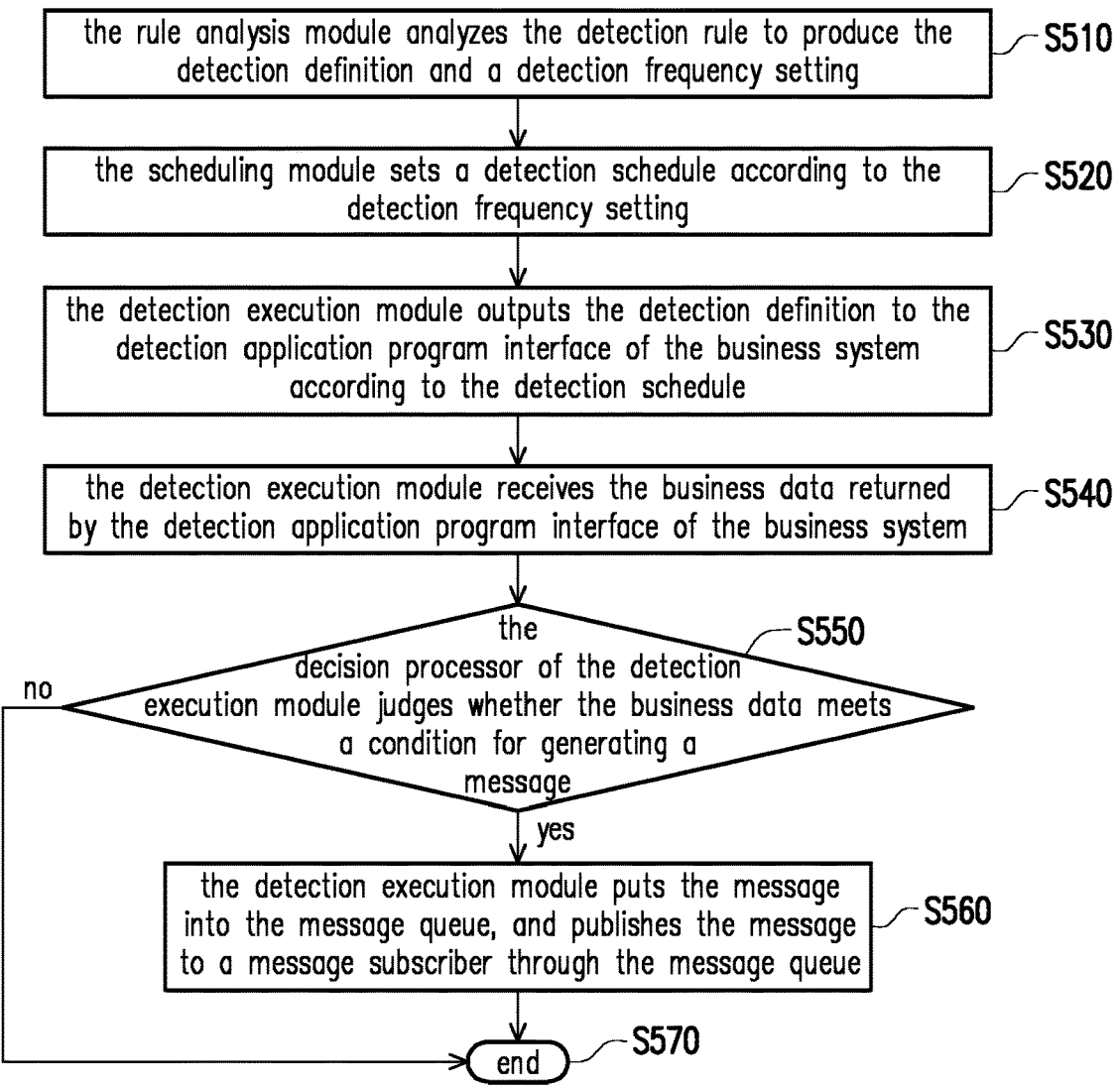
FIG. 5 is a flowchart of an operation of a detection engine according to an embodiment of the disclosure.

FIG. 4 is a schematic diagram of a detection engine and a detection application program interface according to another embodiment of the disclosure. FIG. 5 is a flowchart of an operation of a detection engine according to an embodiment of the disclosure. Refer to FIG. 2, FIG. 4, and FIG. 5. FIG. 4 is used to show a specific embodiment of the detection engine 121 of FIG. 2, and the detection engine 121 may execute Steps S510 to S570 of FIG. 5 to implement the detection measure. The detection engine 121 includes a rule analysis module 121_1, a scheduling module 121_2, a detection execution module 121_3, and a message queue 121_4. The detection execution module 121_3 may include a decision processor. In Step S510, the rule analysis module 121_1 analyzes the detection rule 122 to produce the detection definition 123 and a detection frequency setting to the scheduling module 121_2. In Step S520, the scheduling module 121_2 sets a detection schedule according to the detection frequency setting. In Step S530, the detection execution module 121_3 outputs the detection definition 123 to the detection application program interface 211 of the business system 210 according to the detection schedule. In some embodiments of the disclosure, the detection rule 122 may also be configured to describe the data changes to be detected. After the detection definition 123 is output by the detection execution module 121_3 to the detection application program interface 211 of the business system 210, the detection application program interface 211 may search the business system 210 according to the detection definition 123 to implement the detection of data changes. The data changes may, for example, refer to types such as data addition, data modification, and data review. In addition, in other embodiments of the disclosure, the detection rule 122 may also be configured to describe a special detection behavior extended corresponding to a specific detection scenario or of an additional business condition, so as to meet other data detection requirements. More importantly, the detection rule 122 of the embodiment may be conveniently designed through a specific designer to flexibly meet various detection requirements, which can effectively reduce the development workload of business data detection.

In Step S540, the detection execution module 121_3 receives the business data 213 returned by the detection application program interface 211 of the business system 210. The detection execution module 121_3 may perform unified column name conversion before the business data 213 and business data of other business systems are returned. In Step S550, the decision processor of the detection execution module 121_3 judges whether the business data 213 meets a condition for generating a message. If not, then the detection engine 121 executes Step S570 to end the detection action corresponding to the detection rule. If so, then the detection engine 121 generates a message, and executes Step S560. In the embodiment, the decision processor of the detection execution module 121_3 may execute, for example, a data extraction operation, an aggregation operation, and a data filtering operation on the business data to generate the message. In Step S560, the detection execution module 121_3 puts the message into the message queue 121_4, and publishes the message to a message subscriber 300 through the message queue 121_4. In the embodiment, the detection execution module 121_3 may also communicate with multiple application program interfaces of multiple other business systems, and the detection engine 121 may issue multiple detection rules through an asynchronous manner to reduce waiting due to busy business systems. In addition, messages 124_1 to 124_M generated by different or the same business system may be inserted into the message queue 121_4, and the message queue 121_4 may sequentially or selectively send the messages 124_1 to 124_M to the message subscriber 300 according to subscription requirements of the message subscriber 300, which are not limited by the disclosure. As such, the detection engine 121 serves as the publisher of the message, and the detection engine 121 decouples the message subscriber 300 (that is, the follow-up business component) through the message queue 121_4, which can reduce the system request peak and improve the overall system stability. In addition, the message queue 121_4 may also communicate with multiple message subscribers and is not limited to that shown in FIG. 4.

Figure 6:
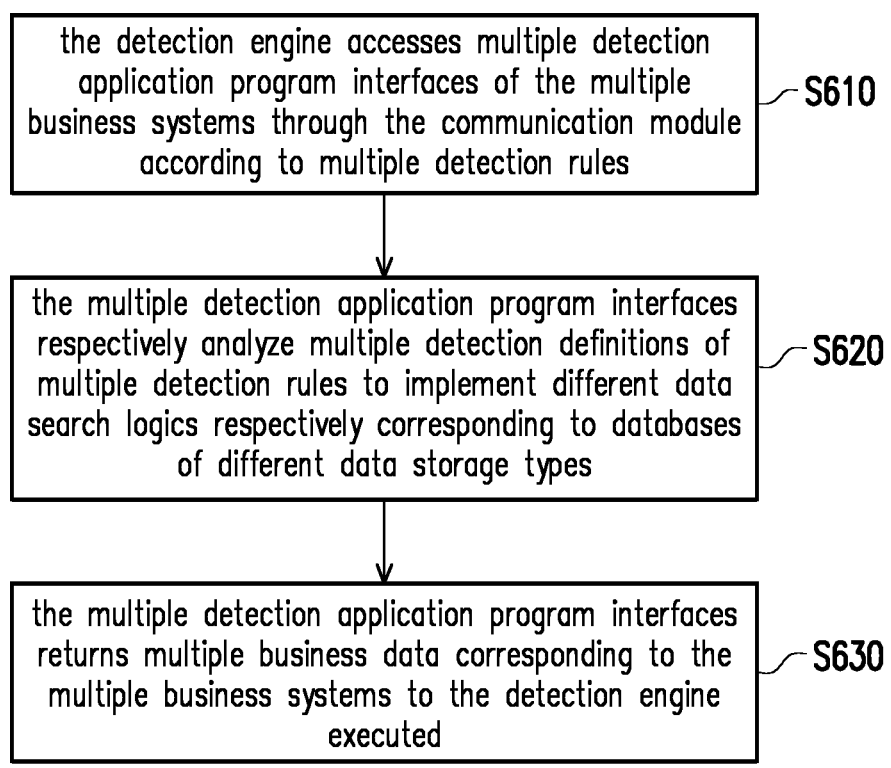
FIG. 6 is a flowchart of a detection method according to another embodiment of the disclosure.

FIG. 6 is a flowchart of a detection method according to another embodiment of the disclosure. Referring to FIG. 1 and FIG. 6, the electronic device 100 in FIG. 1 may execute the following Steps S610 to S630 to detect the multiple business systems 200_1 to 200_N. At least a part of the multiple databases of the business systems 200_1 to 200_N are databases of different data storage types. In Step S610, the processing module 110 of the electronic device 100 may execute a detection engine to access multiple detection application program interfaces of the multiple business systems 200_1 to 200_N through the communication module 130 according to multiple detection rules. In Step S620, the multiple detection application program interfaces of the business systems 200_1 to 200_N respectively analyze multiple detection definitions of multiple detection rules to implement different data search logics respectively corresponding to databases of different data storage types. In Step S630, the multiple detection application program interfaces of the business systems 200_1 to 200_N may return corresponding multiple business data to the detection engine executed by the processing module 110 of the electronic device 100. Therefore, the electronic device 100 of the embodiment may effectively detect the data changes of the multiple business systems 200_1 to 200_N that are complicated and have different data storage types.

However, for the specific implementation and technical details of the relevant modules, the detection engine, the detection rules, and the business systems of the electronic device 100 of the embodiment, please refer to the descriptions of the embodiments of FIG. 1 to FIG. 5 to obtain sufficient teachings, suggestions, and implementation illustrations, which will not be reiterated here.

In summary, the electronic device for detecting the business system and the detection method thereof of the disclosure may access multiple business systems through analyzing the detection engine and executing multiple detection rules with multiple standardized detection definitions predefined by the user. Also, the multiple business systems are provided with multiple standardized detection application program interfaces to receive the multiple detection definitions, so as to execute data search or data change detection of corresponding database, or a special detection behavior corresponding to extension of a specific detection scenario or an additional business condition. As such, each business system of the disclosure only needs to pay attention to the database used by its own system and implement the standard interface thereof using existing technology. Therefore, for the business system of the disclosure, the detection interface is completely separated from the original business logic, so the intrusion to the business system can be effectively reduced. Moreover, for the detection engine of the disclosure, the detection engine does not need to be designed to adapt to various different databases, so the development difficulty of the detection engine can be effectively reduced and the overall development workload can also be effectively reduced. In addition, the unified standardized detection application program interface of the disclosure may also be designed to limit the operations that can be executed (for example, the detection application program interface can only perform search operations and cannot modify databases), so as to effectively improve the system security and reduce the performance impact that complicated and time-consuming operations may have on the business system.

Finally, it should be noted that the above embodiments are only used to illustrate, but not to limit, the technical solutions of the disclosure. Although the disclosure has been described in detail with reference to the foregoing embodiments, persons skilled in the art should understand that they can still modify the technical solutions described in the foregoing embodiments, or equivalently replace some or all of the technical features. However, the modifications or replacements do not cause the essence of the corresponding technical solutions to deviate from the scope of the technical solutions of the embodiments of the disclosure.

What is claimed is:

1. An electronic device for detecting a business system, comprising:
    a memory, configured to store a detection engine and a detection rule corresponding to the business system; and
    a processor, electrically connected to the memory, and configured to execute the detection engine,
    wherein the detection engine accesses a detection application program interface of the business system according to the detection rule, so that the detection application program interface returns business data corresponding to the business system to the detection engine,
    wherein the detection rule comprises a detection definition, and when the detection engine accesses the detection application program interface of the business system, the detection engine sends the detection definition to the detection application program interface of the business system, so that the detection application program interface searches a database of the business system according to the detection definition to obtain the business data,
    wherein the detection rule comprises a detection frequency setting, and the detection engine respectively determines a detection frequency for accessing the detection application program interface of the business system according to the detection frequency setting,
    wherein the detection engine comprises:
        a rule analysis module, configured to analyze the detection rule to produce the detection definition and the detection frequency setting;
        a scheduling module, coupled to the rule analysis module and configured to set a detection schedule according to the detection frequency setting; and
        a detection execution module, coupled to the scheduling module and configured to output the detection definition to the detection application program interface of the business system according to the detection schedule, and the detection execution module is also configured to receive the business data returned by the detection application program interface of the business system.

2. The electronic device according to claim 1, wherein when the detection application program interface judges that the detection definition hits the business data in the database, the detection application program interface returns the business data to the detection engine.

3. The electronic device according to claim 1, wherein the detection rule further comprises a special detection behavior extended corresponding to a specific detection scenario or a special detection behavior of an additional business condition.

4. The electronic device according to claim 1, wherein the detection engine further comprises:
    a message queue, coupled to the detection execution module, wherein
    the detection execution module comprises a decision processor, and when the decision processor judges that the business data meets a condition for generating a message, the decision processor generates the message, and puts the message into the message queue, wherein the message queue publishes the message to a message subscriber.

5. The electronic device according to claim 4, wherein the decision processor executes a data extraction operation, an aggregation operation, and a data filtering operation on the business data to generate the message.

6. The electronic device according to claim 1, wherein the memory is configured to store a plurality of detection rules respectively corresponding to a plurality of business systems, and the detection engine accesses a plurality of detection application program interfaces of the plurality of business systems according to the plurality of detection rules, so that the plurality of detection application program interfaces return a plurality of business data corresponding to the plurality of business systems to the detection engine, wherein the plurality of detection application program interfaces are unified standardized interfaces.

7. The electronic device according to claim 6, wherein at least a part of a plurality of databases of the plurality of business systems are databases of different data storage types, and the plurality of detection application program interfaces respectively analyze a plurality of detection definitions of the plurality of detection rules to implement different data search logics respectively corresponding to databases of different data storage types, wherein the plurality of detection definitions are unified standardized definitions.

8. A detection method of a business system, adapted for being executed by an electronic device to detect the business system, wherein the electronic device comprises a memory, and a processor, wherein the memory is configured to store a detection engine and a detection rule corresponding to the business system, wherein the processor executes the detection engine, the detection method comprising:
    accessing a detection application program interface of the business system through the detection engine according to the detection rule; and
    returning, through the detection application program interface, business data corresponding to the business system to the detection engine,
    wherein the detection rule comprises a detection definition, and when the detection engine accesses the detection application program interface of the business system, the detection engine sends the detection definition to the detection application program interface of the business system, so that the detection application program interface searches a database of the business system according to the detection definition to obtain the business data, wherein the detection rule comprises a detection frequency setting, wherein the step of accessing the detection application program interface of the business system through the detection engine according to the detection rule comprises:

respectively determining, through the detection engine, a detection frequency for accessing the detection application program interface of the business system according to the detection frequency setting, wherein the detection engine executes following operations of:

analyzing, through a rule analysis module, the detection rule to produce the detection definition and the detection frequency setting;

setting, through a scheduling module, a detection schedule according to the detection frequency setting; and outputting, through a detection execution module, the detection definition to the detection application program interface of the business system according to the detection schedule, and also receiving, by the detection execution module, the business data returned by the detection application program interface of the business system.

9. The detection method according to claim 8, wherein the step of returning, through the detection application program interface, the business data corresponding to the business system to the detection engine comprises:

judging, through the detection application program interface, whether the detection definition hits the business data in the database; and returning, through the detection application program interface, the business data to the detection engine when the detection definition hits the business data in the database.

10. The detection method according to claim 8, wherein the detection rule further comprises a special detection behavior extended corresponding to a specific detection scenario or a special detection behavior of an additional business condition.

11. The detection method according to claim 8, wherein the detection engine further executes following operations of:

judging, through a decision processor of the detection execution module, whether the business data meets a condition for generating a message;

generating, through the decision processor, the message when the business data meets the condition for generating the message; and putting the message into a message queue, and publishing, through the message queue, the message to a message subscriber.

12. The detection method according to claim 11, wherein the step of generating, through the decision processor, the message comprises:

executing, through the decision processor, a data extraction operation, an aggregation operation, and a data filtering operation on the business data to generate the message.

13. The detection method according to claim 8, wherein the memory is configured to store a plurality of detection rules respectively corresponding to a plurality of business systems, wherein the detection method further comprises:

accessing a plurality of detection application program interfaces of the plurality of business systems through the detection engine according to the plurality of detection rules, wherein the plurality of detection application program interfaces are unified standardized interfaces; and returning, through the plurality of detection application program interfaces, a plurality of business data corresponding to the plurality of business systems to the detection engine.

14. The detection method according to claim 13, wherein at least a part of a plurality of databases of the plurality of business systems are databases of different data storage types, wherein the step of returning, through the plurality of detection application program interfaces, the plurality of business data corresponding to the plurality of business systems to the detection engine comprises:

respectively analyzing, through the plurality of detection application program interfaces, a plurality of detection definitions of the plurality of detection rules to implement different data search logics respectively corresponding to databases of different data storage types, wherein the plurality of detection definitions are unified standardized definitions.

* * * * *